United States Patent [19]

Drew et al.

[11] 4,169,568

[45] Oct. 2, 1979

[54] HERMETICALLY SEALED PARACHUTE CONTAINER

[75] Inventors: Gene R. Drew, El Centro; Herman M. Gylseth, Chatsworth; William O. Van Buskirk, Anaheim; Richard V. Newkirk, Burbank, all of Calif.

[73] Assignee: The United States of American as represented by the Secretary of the Navy, Washington, D.C.

[21] Appl. No.: 851,336

[22] Filed: Nov. 14, 1977

[51] Int. Cl.² .............................................. B64D 17/42
[52] U.S. Cl. .................................... 244/148; 244/149; 206/524.8; 220/319; 292/256.6
[58] Field of Search ............... 244/147, 148, 141, 139; 220/319, 256, 258, 238, 234; 206/524.8, ; 292/256.6, 256.65; 229/43; 70/18

[56] References Cited

U.S. PATENT DOCUMENTS

| | | | |
|---|---|---|---|
| 1,713,224 | 5/1929 | Gunter | 220/319 |
| 2,467,024 | 4/1949 | Frieder et al. | 244/148 |
| 2,495,341 | 1/1950 | Moran | 244/148 |
| 2,527,020 | 10/1950 | Martin | 244/147 |
| 2,659,557 | 11/1953 | Fogal et al. | 244/148 |
| 2,687,263 | 8/1954 | Frieder et al. | 244/148 |
| 2,709,519 | 5/1955 | Cushman | 206/524.8 |
| 3,138,173 | 6/1964 | Hartman | 244/148 |
| 3,204,810 | 9/1965 | Eckman | 220/256 |
| 3,943,987 | 3/1976 | Rossi | 206/524.8 |
| 4,083,468 | 4/1978 | Batchelor | 220/256 |

Primary Examiner—Galen Barefoot
Attorney, Agent, or Firm—R. S. Sciascia; G. J. Rubens

[57] ABSTRACT

A parachute container for aircrew ejection seats is designed with a rigid body having a reduced volume and weight, and which is hermetically sealed and filled with an inert gas to extend service life without maintenance, the container being provided with a detachable, flexible cover to permit the container to expand in volume proportional to the reduction of external atmospheric pressure. The cover is made of an elastomeric material having elastic memory capable of returning to its preformed shape as atmospheric pressure increases, repeated in operations from sea level to high altitudes.

7 Claims, 7 Drawing Figures

HERMETICALLY SEALED PARACHUTE CONTAINER

BACKGROUND OF THE INVENTION

This invention relates to parachute containers, and more particularly to such a container that can be hermetically sealed from the atmospheric environment until actual parachute deployment.

Atmospheric environment has a long term deleterious effect on parachutes, thus requiring frequent and costly maintenance inspections.

Conventional non-sealed parachutes require periodic drying and repacking on a routine schedule i.e., every 217 days. Navy standards also establish a limit of humidity to 5% of the dry weight. Different drying devices have been designed to meet this standard of humidity, including the old-type drying towers and new devices, such as vacuum and heat drying machines. As a result of improper drying techniques or from other causes, excess moisture remaining in the parachute after packing will freeze when the aircraft or parachute are deployed in cold climates or at high altitudes. If the parachute is subsequently deployed in a frozen condition, the parachute may malfunction and cause serious fatal injury to personnel, a fact well documented by official U.S. naval accident records.

Thus, a non-sealable parachute container has a short service life, and therefore is costly to maintain, as well as more likely to cause personnel injury during employment.

SUMMARY OF THE INVENTION

A hermetically sealed parachute container is provided having a reduced volume and weight, and an extended shelf and service life designed to eliminate frequent maintenance normally required to inspect and repack the parachute.

The container is constructed of a rigid, open box-like body having a base for mounting on a conventional aircraft ejection seat. The open end of the container is normally sealed by a flexible membrane closure, which is detached during parachute deployment. Means are provided to evacuate the container and insert an inert gas to preserve the parachute from environmental effects.

The flexible membrane closure when clamped around the container body opening enables the container volume to expand and contract with changes in atmosphere pressure from very low to very high altitudes during aircraft flights, without rupturing the hermetically sealed closure. A semi-rigid protective cover may be provided to protect the flexible membrane cover during normal handling, the cover also being detached upon actual parachute deployment.

DESCRIPTION OF THE PREFERRED EMBODIMENT

Figure 1:
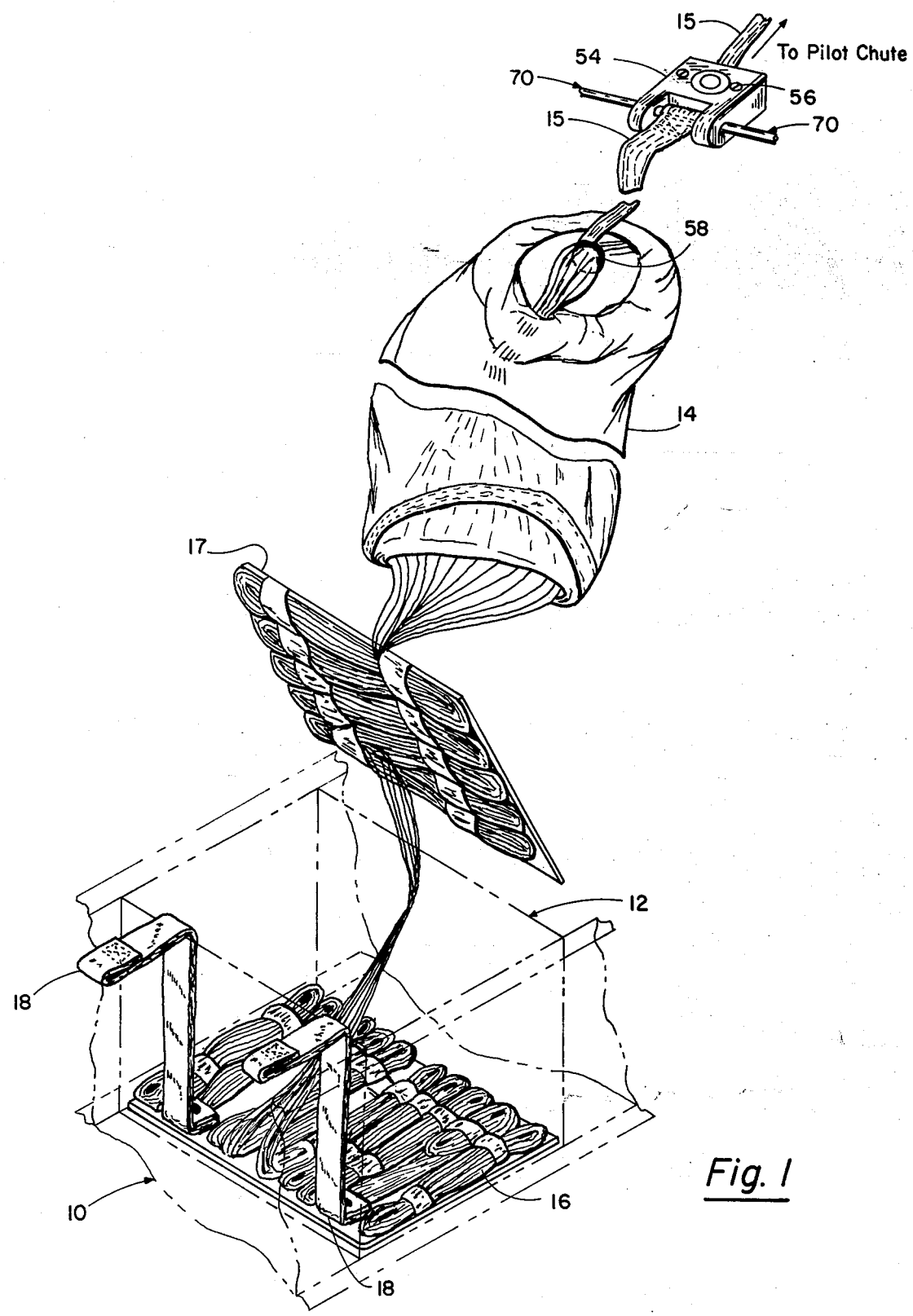
FIG. 1 is a diagrammatic view of the novel parachute container illustrating the start of parachute deployment.

Referring to the drawings where like reference numerals refer to similar parts throughout the figures there is shown in FIG. 1, a portion of a conventional parachute ejection seat 10 on which is mounted the novel parachute container 12, shown diagrammatically, from which the main parachute 14 is in the process of being withdrawn by a drogue or pilot chute (not shown) via connecting bridle strap 15. Suspension lines 16 are housed in assembly bag 17 and connected to the aircrewman harness by riser straps 18 which extend through the sealed container in a manner to be described.

Figure 2:
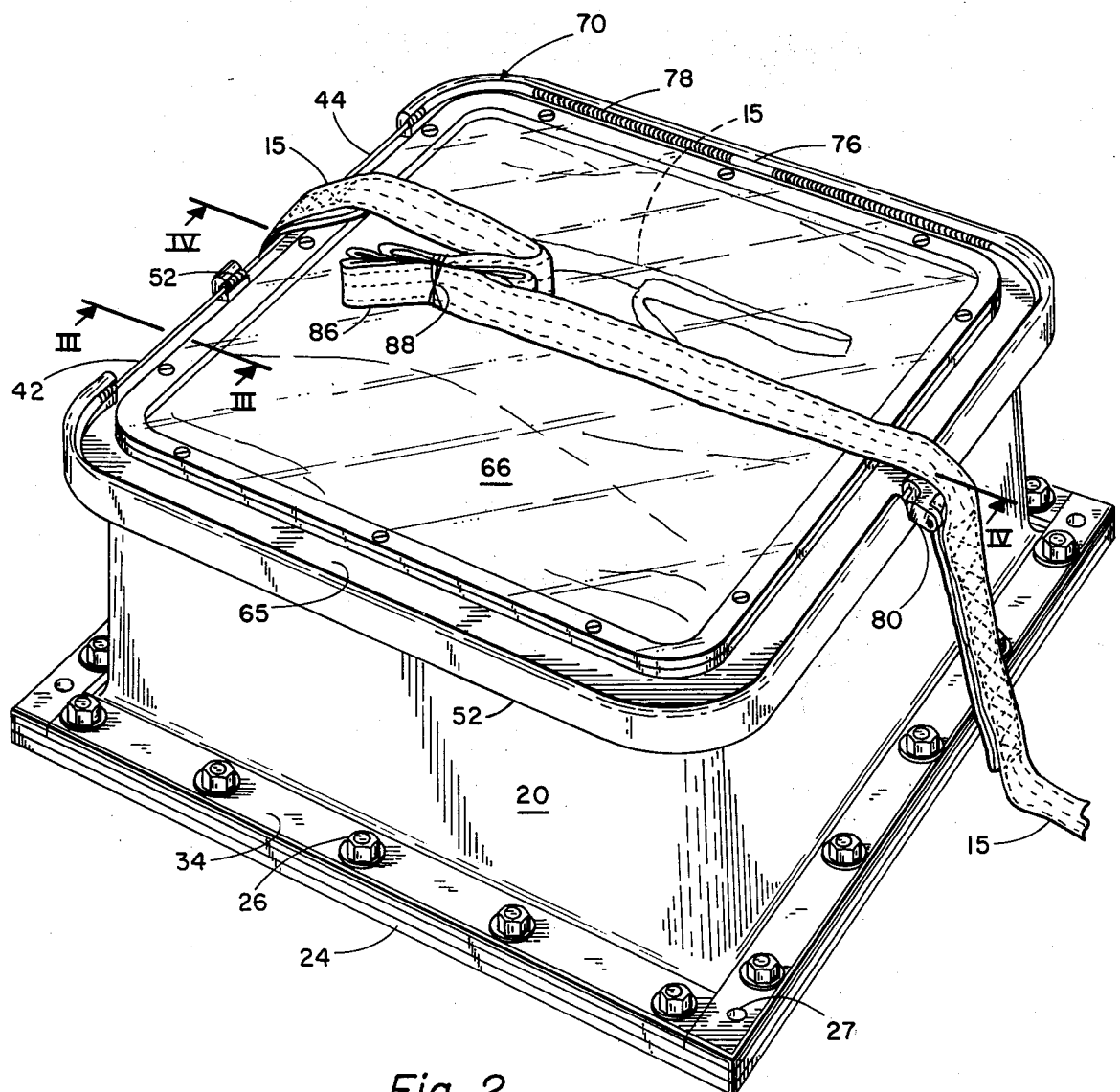
FIG. 2 is a perspective top view of the assembled parachute container.
Figure 3:
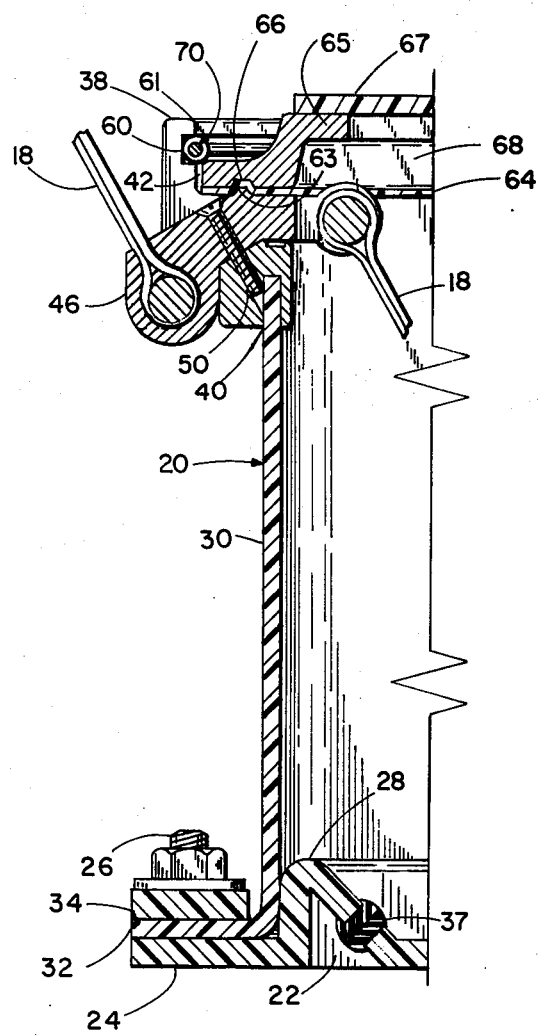
FIG. 3 is a cross-sectional view of one side of the parachute container taken along lines of FIG. 2, showing one of the riser strap pass-through fittings.

Novel parachute container 12, shown in greater detail in FIGS. 2-4, comprises a rectangular box-like body 20 preferably made of rigid plastic material consisting of a base plate 22 having a flat outer rim portion 24 having a plurality of drilled holes to receive nylon bolts 26 for attachment of reinforcement strips 34. Base plate 22 and strips 34 have holes 27 for mounting the container on the ejection seat.

Base plate 22 has a raised annular shoulder 28 around the rim portion 14 for snugly receiving in a nesting relation, one end of a tubular skirt portion 30 having a complementary outwardly projection lip portion 32 for seating on rim 24, which connection is suitably bonded to ensure a sealed joint. Skirt 30 may be fabricated of plastic approximately 0.125" thick. A plastic reinforcing strip 34 is cemented on top of lip 32, both having aligned holes to receive bolts 26. In practice base plate 22 and skirt 30 can be injection molded in one piece of reinforced plastic material.

Figures 4A, 4B:
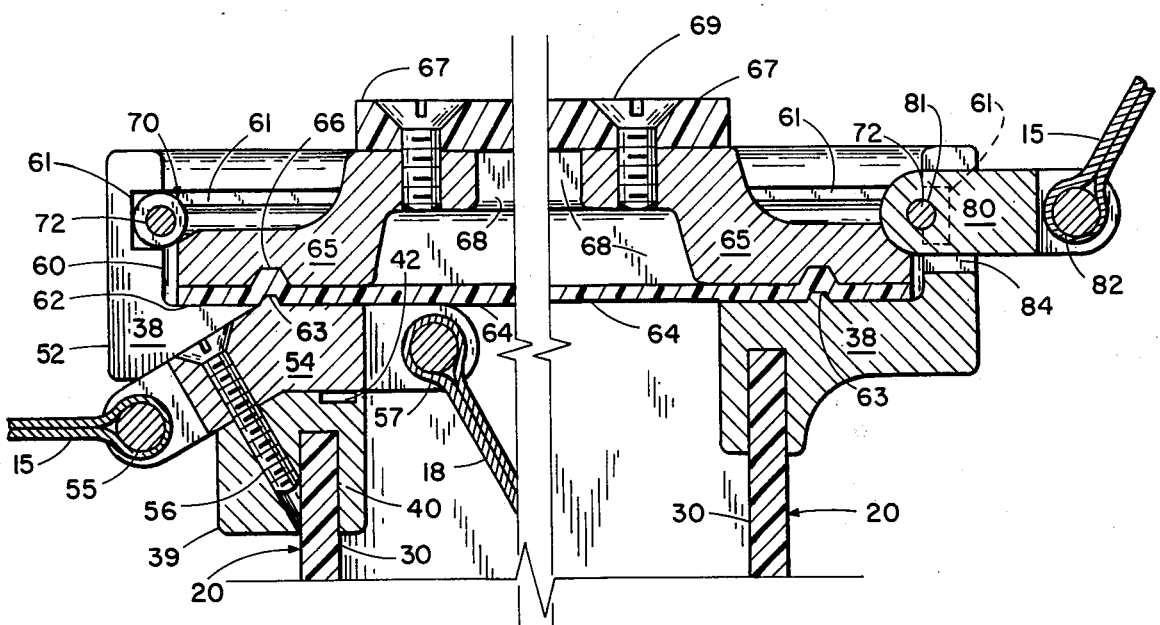
FIG. 4a, 4b and 4c are cross-sectional views of different portions of the parachute container taken along line IV—IV of FIG. 2.
Figure 4C:
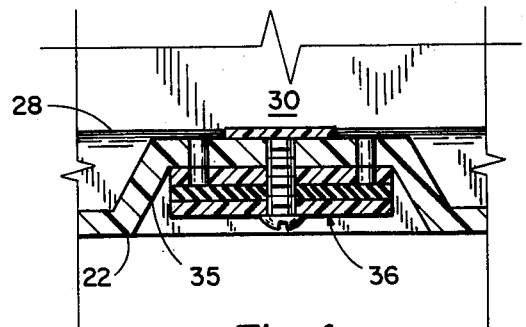

As shown in FIG. 4c, base plate 22 is also fabricated with a central depression 35 for housing a one-way flapper-type check valve 36. Valve 36 allows any inert gas that was injected into the container when packaged at ground elevation through gas filler valve 37 (FIG. 3) to vent at higher altitudes, in a manner to be described. Filler valve 37 also enables the parachute container to be flushed with the inert gas to remove any air and moisture upon completion of the initial parachute packaging operation.

As best shown in FIGS. 3, 4a and 4b, the upper end of container body 30 is capped with a rim member 38 having a reduced shoulder 39 formed with an annular channel 40 to receive the upper end of skirt 30 which is cemented therein. Rim member 38 and skirt 30 fabricated with two cutout sections 42 and 44 on one side of the container, (see FIG. 2) to accommodate riser fittings 46 and 48 (one being illustrated in FIG. 3) each secured by plastic, shearable screws 50 to rim 38. Riser fittings 46 and 48 provide pass through connections for the intermediate portion of the riser straps 18 between the harness (not shown) and main parachute 14 normally stowed within container 12.

An additional cutout section 52 (FIG. 2) is formed in rim member 38 laterally positioned between cutouts 42 and 44 to accommodate a pass-through bridle strap fitting 54 (FIG. 1 and FIG. 4a) also secured by plastic, breakable screws 56 to the rim 38. One end of fitting 54 (FIG. 1) is connected by pin 55 to bridle strap 15 from the pilot chute. The other end of fitting 54 is connected by a pin 57 to a portion of bridle strap 18 positioned within the container for a connection to the apex 58 of main parachute 14 housed therein. Thus the pass-through fittings enable the respective straps to enter the sealed container. Fittings 46, 48 and 54 are suitably cemented within their respective cutout sections in the rim to maintain the hermetically sealed environment in the container.

As best shown in FIGS. 4a and 4b an internal side wall of recess 60 of rim 38 is provided with an annular channel 61. A shoulder 62 of rim 38 is fabricated with an annular ridge 63, as are provided pass-through fittings 46, 48 and 54, the ridges of the fittings being coterminous with the sealing ridge on shoulder 62 forming a substantially continuous ridge, in a manner to be described.

A flexible diaphragm or membrane 64 (FIGS. 3 and 4) snugly fits over ridges 63 and into rim recess 66 and rests on shoulder 62. The diaphragm is made preferably of flexible elastomeric material having a high degree of elastic memory and a low permeability rate such as a vacuum bag silicone made by D Aircraft Company of Anaheim, CA and having a thickness of 0.060 inches.

An annular clamping ring 65 also fits snugly into rim 38 and rests on diaphragm 64. The inner face of clamping ring 65 has an annular groove 66 designed to be complementary to ridge 63 with which it functions to seal the container opening when diaphragm 64 is securely clamped therebetween in a manner to be described. A plastic cover plate 67 is secured by a bolts 69 centrally to the outer face of clamping ring 65 and functions to protect the flexible diaphragm 64 during normal building. The central part of ring 65 is offset to provide a space 68 to enable the diaphragm to flex during changes of atmospheric pressures to which the container may be subjected. The entire container is coated with a protective paint for ultraviolet light protection.

Figure 5:
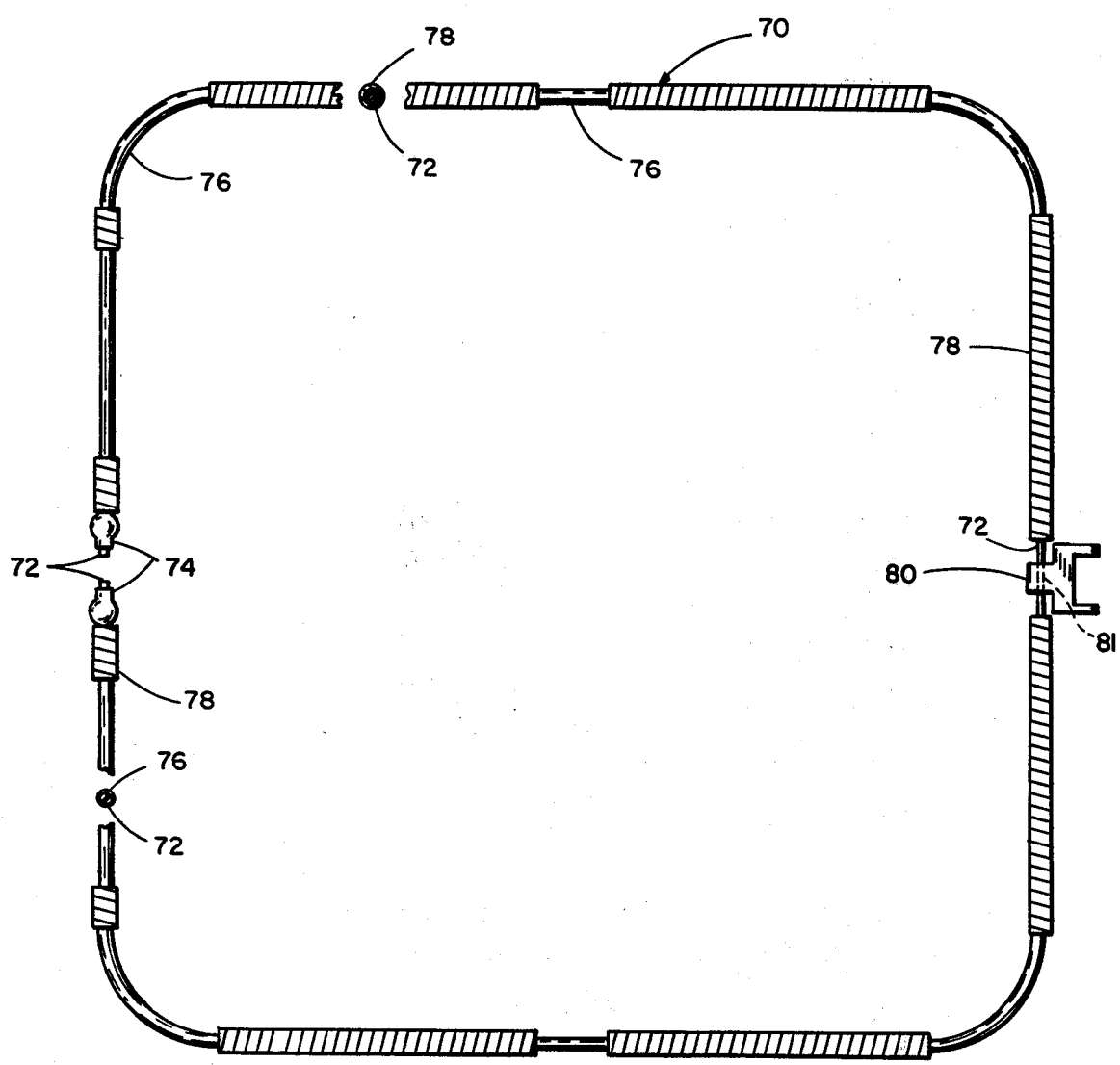
FIG. 5 is a reduced plan view of the locking ring cable and associated bridle strap fitting.

Ring 65 is retained in a normal clamped position as shown in FIGS. 2 to 4, by a lock ring cable assembly 70 that is removably press-fitted in lock ring channel 61 in a manner to wedge clamping ring 65 and diaphragm 64 against shoulder 62. As best shown in FIG. 5, lock ring cable assembly 70 consists of a central aircraft cable 72 terminating in opposed swaged ball ends 74 normally anchored in rim 38. Cable 72 is covered with spaced protective teflon tubes 76, that serve to keep in alternately spaced relation a series of coil springs 78 each having a diameter designed for press fitting in locking engagement with channel 61. In the secured position, coil springs 78 bear against the periphery of clamping ring 65 to maintain the latter in sealed engagement to container 20. Lock ring cable assembly 70 is displaced from its clamping position in channel 61 by a lock ring fitting 80 (FIGS. 2 and 4b) which has an opening 81 at one end through which is threaded the cable 72. The other end of fitting 80 is pinned at 82 to a looped portion of bridle strap 15 extending to the pilot chute. Fitting 80 lies in a recessed portion 84 (FIG. 4) of rim member 38. A portion of bridle strap 15 between fitting 80 and pass-through fitting 54 is provided with a slack portion at 86 (FIG. 2) bundled together by a break cord 88 and which produces a time delay after ring cover 65 is ejected before the main parachute is withdrawn from the container.

Accordingly, bridle strap 15 when tensioned by deployment of the pilot chute (FIG. 1) will first displace lock ring cable fitting 80 from rim member 38, and then pulls out lock ring cable assembly 70 from rim channel 61 to release clamping ring 65 from container body 20. Clamping ring 65 is thrown free, and after a delay occasioned by the slack 86 in bridle strap 15, the bridle strap exerts a pull on pass-through fitting 54, shearing screws 56 to pull out main parachute 14. Parachute forces subsequently shear screws 50, freeing parachute riser strap fittings 46 and 48 from rim 38 and the parachute system is completely separated from the ejection seat and container.

The novel parachute container of this invention thus provides a lighter weight assembly having a substantially longer shelf and service life, and eliminating the need for periodic repacking. Use of a rigid, hermetically sealed, container enables the parachute container to be vacuum sealed, filled with an inert protective gas and evacuated again to provide an inert environment for the canopy. The container is closed with a flexible membrane having mechanical memory to permit growth of the container volume proportional to the reduction of external atmospheric pressure, and to return to its preformed shape as atmospheric pressure increases upon landing. Thus, the parachute container may be repeatedly used in flight operations throughout the altitude spectrum, and in inclement weather, without repacking.

Obviously many modifications and variations of the present invention are possible in the light of the above teachings. It is therefore to be understood that within the scope of the appended claims the invention may be practiced otherwise than as specifically described.

What is claimed is:

1. A hermetically sealable personnel parachute container for attaching to an aircrew ejection seat comprising:
   a rigid box-like body having a mouth opening to the cavity at one side for receiving a parachute;
   means for securing the container to an ejection seat;
   a removable flexible diaphragm for closing and sealing the mouth opening;
   said flexible diaphragm having the property of elastic memory to enable the container volume to expand and contract with changes in atmospheric pressure;
   an outer protective cover detachably secured to the body in spaced relation to the diaphragm to allow said diaphragm to flex with changes in atmospheric pressure;
   means for evacuating the sealable container;
   releasable clamping means for securing said protective cover and said diaphragm to the periphery of the container;
   means operable upon deployment of the ejection seat for releasing the clamping means;
   whereby the cover and the diaphragm can be displaced from the body and the parachute deployed from the container cavity.

2. The parachute container of claim 1 wherein said cover and said container are provided with flat portions having an annular complementary ridge and recess between which the periphery of said diaphragm is clamped in sealed relationship.

3. The parachute container of claim 1 wherein said cover includes a an annular ring on which is secured a plate-like transparent member.

4. A hermetically sealed personnel parachute container for attaching to an aircrew ejection seat comprising:
   a rigid box-like body having a mouth opening for receiving a parachute;
   means for securing the container to an ejection seat;
   a removable flexible diaphragm for closing and sealing the mouth opening;

a protective cover for said diaphragm detachably secured to the body opening in spaced relationship thereto;

releasable clamping means for securing said cover around its periphery to the container body and in clamping relationship to the diaphragm, said clamping means comprising a flexible, ring-shaped cable; and means operable upon deployment of the ejection seat for releasing the clamping means.

5. The parachute container of claim 4 wherein said cable is relesed by a pivotal fitting supported in the container and connected to a pilot chute bridle strap.

6. The parachute container of claim 4 wherein said cover fits within said container body, said body adjacent the mouth opening having an inner peripheral recess, said releasable means being a cable assembly which fits within the recess in a manner to wedge the cover in a secured condition.

7. The parachute container of claim 6 wherein said cable is provided with concentric wound spring segments which releasably maintain the cable within the recess.

* * * * *